US010852389B2

(12) United States Patent
Chang et al.

(10) Patent No.: US 10,852,389 B2
(45) Date of Patent: Dec. 1, 2020

(54) INTERFERENCE-TOLERANT MULTIPLE-USER RADAR SYSTEM

(71) Applicant: THE REGENTS OF THE UNIVERSITY OF CALIFORNIA, Oakland, CA (US)

(72) Inventors: Mau-Chung Chang, Los Angeles, CA (US); Yu-Hsiu Wu, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 134 days.

(21) Appl. No.: 16/138,956

(22) Filed: Sep. 21, 2018

(65) Prior Publication Data

US 2019/0094334 A1 Mar. 28, 2019

Related U.S. Application Data

(63) Continuation of application No. PCT/US2017/023644, filed on Mar. 22, 2017.
(Continued)

(51) Int. Cl.
*G01S 7/02* (2006.01)
*G01S 7/35* (2006.01)
(Continued)

(52) U.S. Cl.
CPC ............... *G01S 7/023* (2013.01); *G01S 7/35* (2013.01); *G01S 7/354* (2013.01); *G01S 7/40* (2013.01);
(Continued)

(58) Field of Classification Search
CPC ...... G01S 7/023; G01S 13/347; G01S 13/931; G01S 7/354; G01S 7/40; G01S 13/584;
(Continued)

(56) References Cited

U.S. PATENT DOCUMENTS

| 5,314,037 A * | 5/1994 | Shaw .................. B60R 16/0231 180/169 |
| 2004/0174928 A1* | 9/2004 | Siwiak ............... H04B 1/71635 375/146 |

(Continued)

FOREIGN PATENT DOCUMENTS

CN 102123023 B 7/2011

OTHER PUBLICATIONS

International Search Report and Written Opinion dated Jun. 16, 2017, related PCT international application No. PCT/US2017/023644, pp. 1-11, claims searched, pp. 12-16.
(Continued)

*Primary Examiner* — Bo Fan
(74) *Attorney, Agent, or Firm* — O'Banion & Ritchey LLP; John P. O'Banion

(57) ABSTRACT

A frequency hopping continuous wave (FHCW) radar system which utilizes a one-coincidence sequence to create a form of FH multiplexing to allow discerning returning signals from interference. An EHC code generator sends codes to an FH waveform generator coupled to a transmitter. A receiver outputs a received signal to a correlator which correlates received signal with a delayed transmitted signal, and sends results for digital signal processing to determine target range and velocity. Use of the one-coincidence sequence provides for the interference level to be well managed and below the radar return signal; assuring that the returning radar signals can be discerned from interference.

19 Claims, 8 Drawing Sheets

Related U.S. Application Data

(60) Provisional application No. 62/312,284, filed on Mar. 23, 2016.

(51) Int. Cl.
| | | |
|---|---|---|
| *H04B 1/7097* | (2011.01) | |
| *H04B 1/711* | (2011.01) | |
| *H04B 1/69* | (2011.01) | |
| *H04B 1/713* | (2011.01) | |
| *H04B 1/715* | (2011.01) | |
| *H04B 1/7107* | (2011.01) | |
| *G01S 13/34* | (2006.01) | |
| *G01S 13/931* | (2020.01) | |
| *G01S 7/40* | (2006.01) | |
| *G01S 13/58* | (2006.01) | |
| *H04B 1/7156* | (2011.01) | |

(52) U.S. Cl.
CPC .......... *G01S 13/347* (2013.01); *G01S 13/584* (2013.01); *G01S 13/931* (2013.01); *H04B 1/69* (2013.01); *H04B 1/7097* (2013.01); *H04B 1/711* (2013.01); *H04B 1/713* (2013.01); *H04B 1/715* (2013.01); *H04B 1/7107* (2013.01); *G01S 2007/027* (2013.01); *H04B 2001/71563* (2013.01)

(58) Field of Classification Search
CPC ... G01S 7/35; G01S 2007/027; H04B 1/7097; H04B 1/711; H04B 1/69; H04B 1/713; H04B 1/715; H04B 1/7107; H04B 2001/71563
USPC .......................................... 342/112, 195, 201
See application file for complete search history.

(56) References Cited

U.S. PATENT DOCUMENTS

| | | | | |
|---|---|---|---|---|
| 2011/0123028 A1* | 5/2011 | Karabinis | ............ | H04B 1/7097 380/270 |
| 2013/0293421 A1* | 11/2013 | Bartone | .................. | G01S 1/042 342/386 |
| 2013/0300573 A1* | 11/2013 | Brown | .................. | A61B 5/0002 340/870.01 |
| 2014/0232589 A1* | 8/2014 | Trotta | .................... | H03F 1/0205 342/175 |
| 2015/0042503 A1* | 2/2015 | Morelande | .............. | G01S 13/04 342/27 |
| 2016/0234669 A1* | 8/2016 | Feher | .................... | A61B 5/0022 |

OTHER PUBLICATIONS

Bao, J. et al., "Frequency hopping sequences with optimal partial Hamming correlation", Cornell University Library; Publication [online]. Nov. 11, 2015, pp. 1-16.

Bin, L., "One-Coincidence Sequences with Specified Distance Between Adjacent Symbols for Frequency-Hopping Multiple Access," IEEE Trans. Commun., vol. 45, No. 4, pp. 408-410, Apr. 1997.

Wronski, L. et al., "Extended Hyperbolic Congruential Frequency Hop Code: Generation and Bounds for Cross- and Auto-Ambiguity Function," IEEE Trans. Commun., vol. 44, No. 3, pp. 301-305, Mar. 1996.

Giannini, V. et al., "A 79 GHz Phase-Modulated 4 GHz-BW CW Radar Transmitter in 28 nm CMOS," IEEE J. Solid-State Circuits, vol. 49, No. 12, pp. 2925-2937, Dec. 2014.

Luo, T.-N. et al., "A 77-GHz CMOS FMCW Frequency Synthesizer with Reconfigurable Chirps," IEEE Trans. Microw. Theory Techn., vol. 61, No. 7, pp. 2641-2647, Jul. 2013.

\* cited by examiner

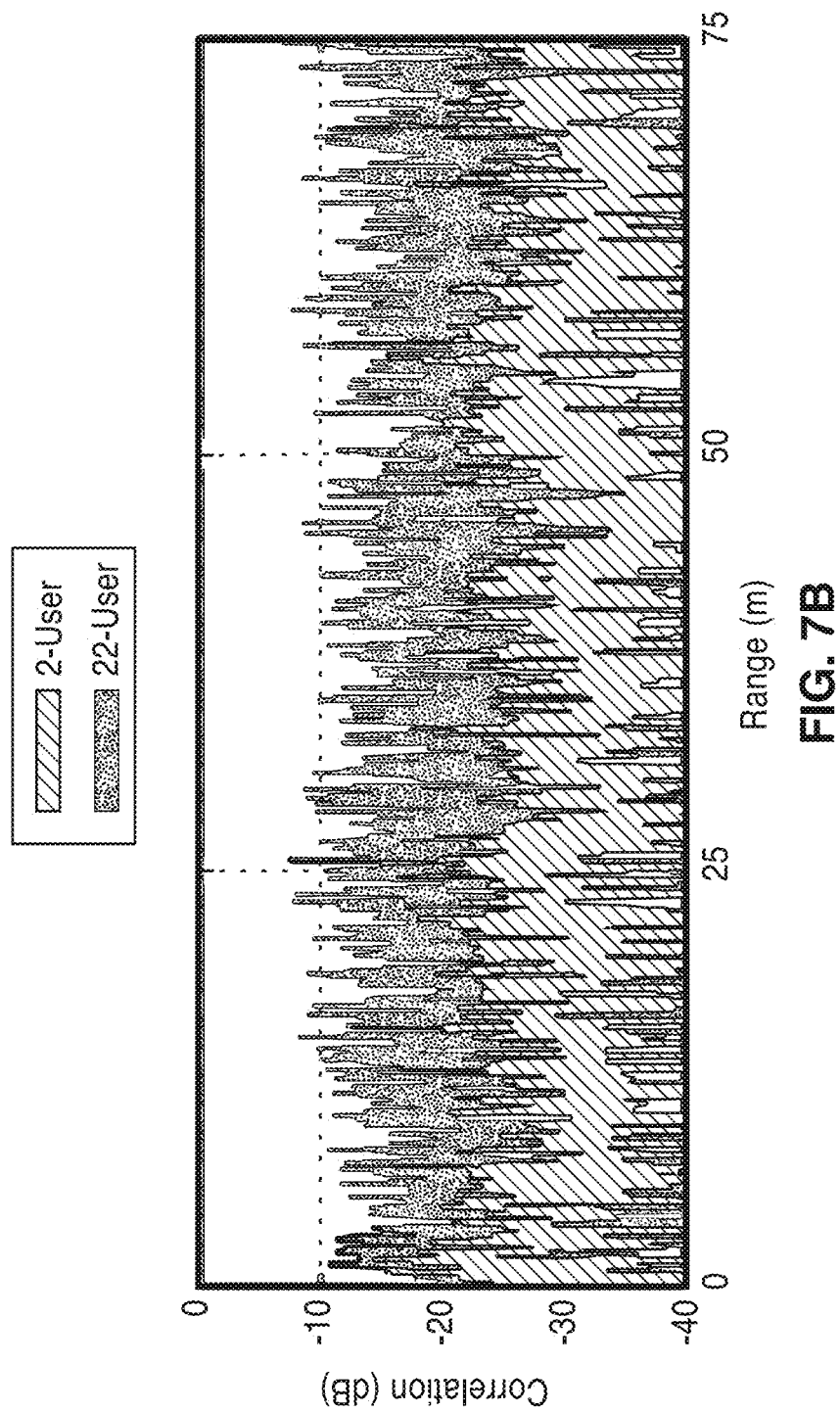

INTERFERENCE-TOLERANT MULTIPLE-USER RADAR SYSTEM

CROSS-REFERENCE TO RELATED APPLICATIONS

This application is a 35 U.S.C. § 111(a) continuation of PCT international application number PCT/US2017/023644 filed on Mar. 22, 2017, incorporated herein by reference in its entirety, which claims priority to, and the benefit of, U.S. provisional patent application Ser. No. 62/312,284 filed on Mar. 23, 2016, incorporated herein by reference in its entirety. Priority is claimed to each of the foregoing applications.

The above-referenced PCT international application was published as PCT International Publication No. WO 2017/165556 on Sep. 28, 2017, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to frequency-modulated continuous-wave (FMCW) radars, and more particularly to an FMCW radar utilizing a form of code-division multiplexing involving one-coincidence frequency hopping code.

2. Background Discussion

Vehicle collision avoidance systems as well as autonomously driven vehicles (and other applications involving relative motion between bodies in motion) require the use of radar systems which can be proximal one another without posing intractable interference issues. Radar interference issues arise due to the multiple signals transmitted from the radars on adjacent vehicles operating in the same area at the same time. Consequently, radar interference mitigation techniques are necessary in such multiple-vehicle environments. Further complicating the problem is that in order to accurately detect and localize adjacent vehicles, several radars may be carried on each vehicle.

A low-cost and highly-integrated CMOS radar or sensor could be the best candidate to fulfill this growing industrial need. Linear frequency-modulated continuous-wave (FMCW) radars with constant envelope waveforms are suitable for low-power/low-cost CMOS implementation.

However, the ghost target due to other radars and radio interference generates a false alarm and lowers the probability of detection. Some proposed interference mitigation techniques rely on allocating frequency sub-bands at different times for different users to avoid concurrent frequency band usage. Yet in this process a number of users must trade off with the available bandwidth which hampers range resolution.

Accordingly, a need exists for a radar system which can be utilized by multiple users in close proximity, while still discerning range and velocity information for the system of each user. The present disclosure fulfills that need and overcomes shortcomings of previous radar systems.

BRIEF SUMMARY

An interference-tolerant radar is disclosed which still properly discerns range and velocity of targets despite receiving multiple signals transmitted from adjacent vehicles. The disclosed radar apparatus is well suited for a number of radar applications, and may be particularly well-suited for use in autonomous driving and various collision avoidance applications.

The interference immunity of this radar system has been realized by applying a specific code-division multiplexing method, involving utilizing one-coincidence frequency hopping code with the continuous-wave (CW) radar. We have implemented a prototype of this radar system in 65 nm CMOS for operation at 24 GHz with a 1 GHz bandwidth (equivalently with 15 cm range resolution). Measurements indicate that the prototype can support up to at least 22 adjacent vehicles simultaneously by using the optimal Hamming correlation property of the extended hyperbolic congruential code. It will be appreciated that the present technology can be utilized across a wide range of radar implementations (e.g., having different applications, device technology, operating frequency, bandwidth, and so forth) without departing from the teachings of the present disclosure.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

Figure 7A:
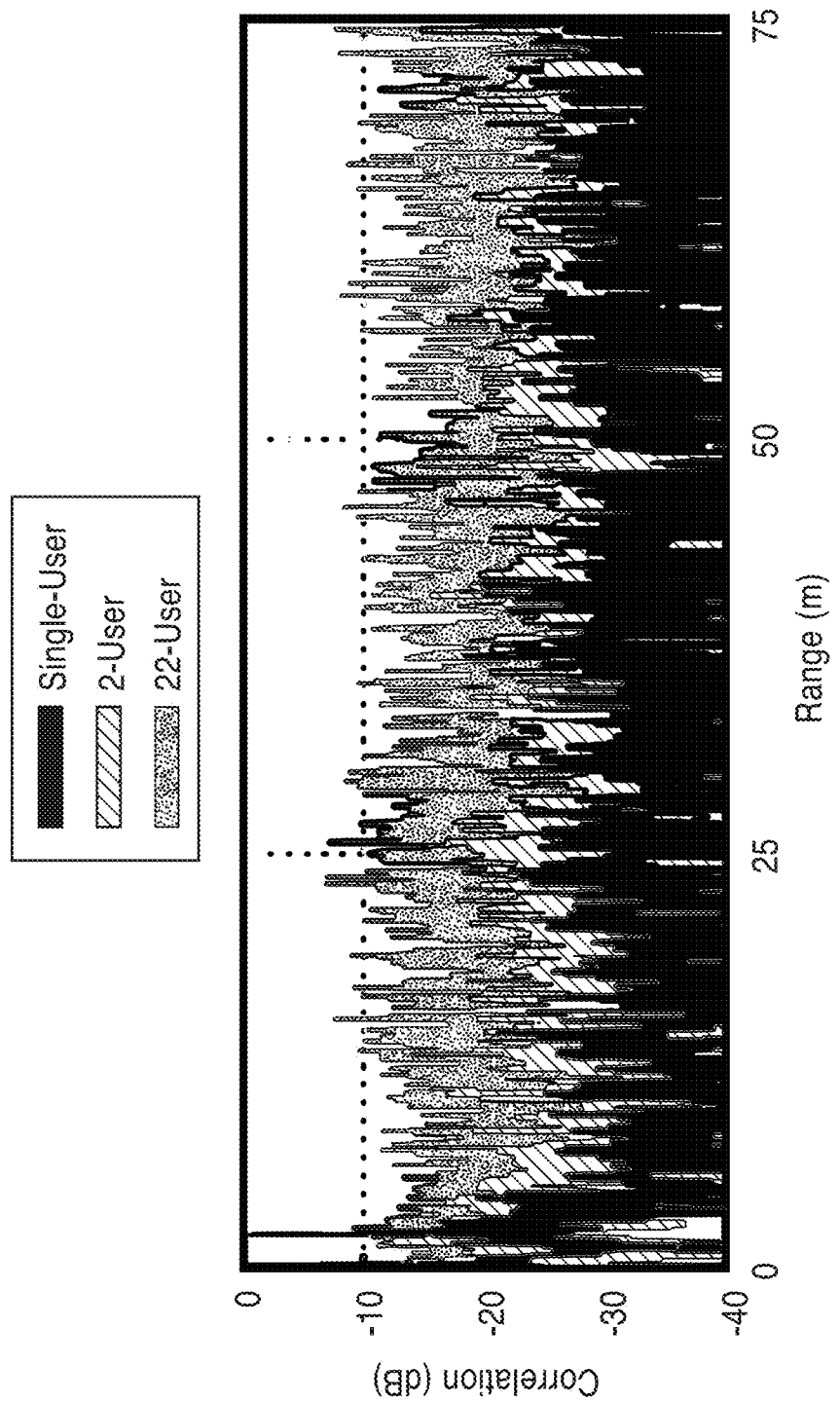

FIG. 7A and FIG. 7B are plots of measured range showing auto-correlation in an environment with 1, 2 and 22 users in FIG. 7A, and correlation in an environment with 2 and 22 users in FIG. 7B.

DETAILED DESCRIPTION

A one-coincidence code-division frequency hopping (FH) CW radar is described which can support up to at least 22 users with 1 GHz bandwidth concurrently. FH is a spread-spectrum (SS) technique that can be utilized herein for achieving a multiple-user multiplexing. Every user follows a sequence of frequencies to hop with respect to time. It should be appreciated that "users" are spoken of herein as being a user operating a conveyance (e.g., vehicle) which incorporates an instance of the presently disclosed radar apparatus. When two user radar systems occupy the same frequency channel concurrently, the coincidence, or "hit", happens and it results in mutual interference.

The present disclosure overcomes this mutual interference by utilizing a one-coincidence sequence which provides a form of multiple-user multiplexing. The one-coincidence sequence has the property that the maximum number of hits between any pair of sequences belonging to the set is one. According to the present disclosure an extended hyperbolic congruential (EHC) code is utilized as the one-coincidence FH code in a CMOS radar prototype whose performance benefits have been validated.

Figure 1A:
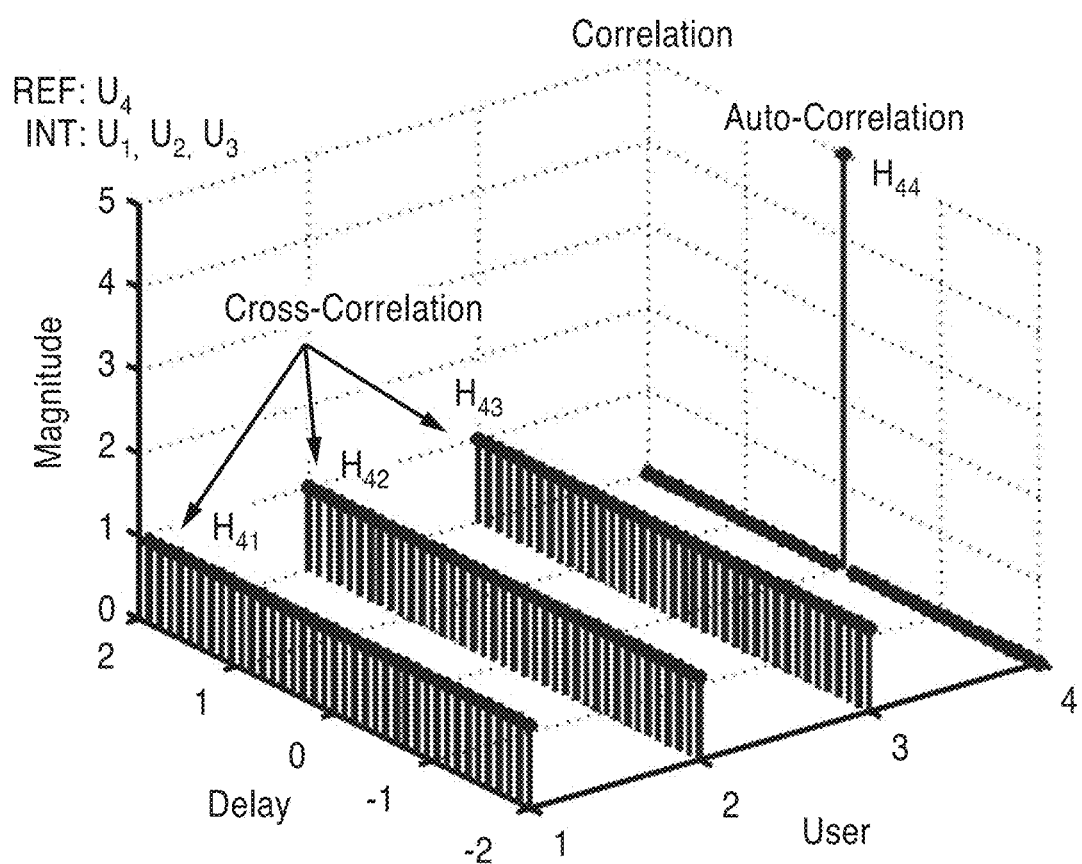
FIG. 1A through FIG. 1E illustrate the correlation property of an EHC code set with N=5 according to an embodiment of the present disclosure.
Figure 1B:
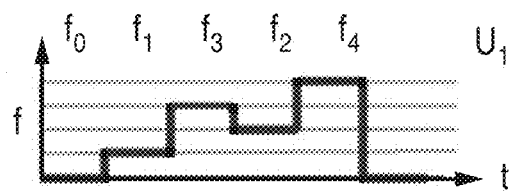
Figure 1C:
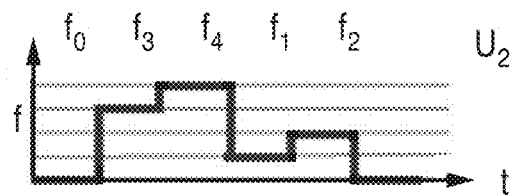
Figure 1D:
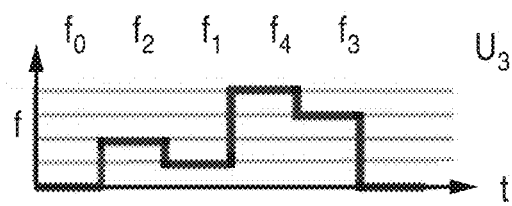
Figure 1E:
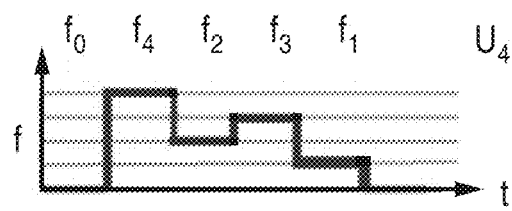

FIG. 1A through FIG. 1E Illustrates Hamming correlation property of this EHC code set. In FIG. 1A the x-axis is user ID, y-axis is the circular time shift t, and z-axis is the magnitude of Hamming correlation $H_{xy}$ (t). In FIG. 1B through FIG. 1E frequency hopping is depicted for the example users U1, U2, U3 and U4, with each showing a total of 5 hop periods including an initial $f_0$, followed by $f_1$, $f_2$, $f_3$, $f_4$, in various orders for each user. It should be appreciated that the description of four users, as well as the number of hops, are described by way of example only, as the present disclosure can be utilized across a wide number of users in the vicinity, and with any practical number of hops. It will be noted that the EHC code generator is configured to generate N-1 different codes to ensure N-1 users can work in the same area at the same time, for example, at a crossroad. They configure themselves on the fly. If more than N-1 users appear, then interference would arise.

In the example above with four users, if user i=4 (U4) is chosen as the reference (REF), then other users i=1, 2, 3 (U1, U2, U3) are considered interference (INT). It will be appreciated that the reference signal is selected from the standpoint of the particular user/vehicle; with signals from the other proximal users/vehicles being considered interference. When the reference signal correlates with itself, resulting in an auto-correlation function, it has a peak of 5, at zero delay and is zero elsewhere. If there are N-1 users, then peak will be N. In the examples N=5 was only used by way of example, but N can be any number, for example, N=23 is the case of the experiment with 22 users. When the reference signal correlates with interference, resulting in a cross-correlation function, it has the maximum level of one for all delays. It will be noted that the cross-correlation is handled in the correlator. That is, ($H_{am}$, $H_{cm}$)=(0,1), fulfills one-coincident FH code. When all four user signals sum together, the total interference level becomes $H_{xy}$ (t)=(N-1)-1=3, t=0. The signal peak for this example is $H_{xy}$ (0)=N=5. Therefore, the target signal can be extracted from the interference in the multiple-user environment. For auto-correlation, $H_{am}$=0 shows the ideal case that has no ambiguity for any time shift. For cross-correlation, $H_{cm}$=1 shows the ideal case that has no other similarity if choosing any one of the frequency codes to align. So one important benefit of the disclosed radar system is that it can physically generate and fulfill this ideal in tolerating interference. N-1 users will need N hop periods and the peak will be equal to N. The experiment showed 23 hops and can accommodate 22 users simultaneously.

Figure 2:
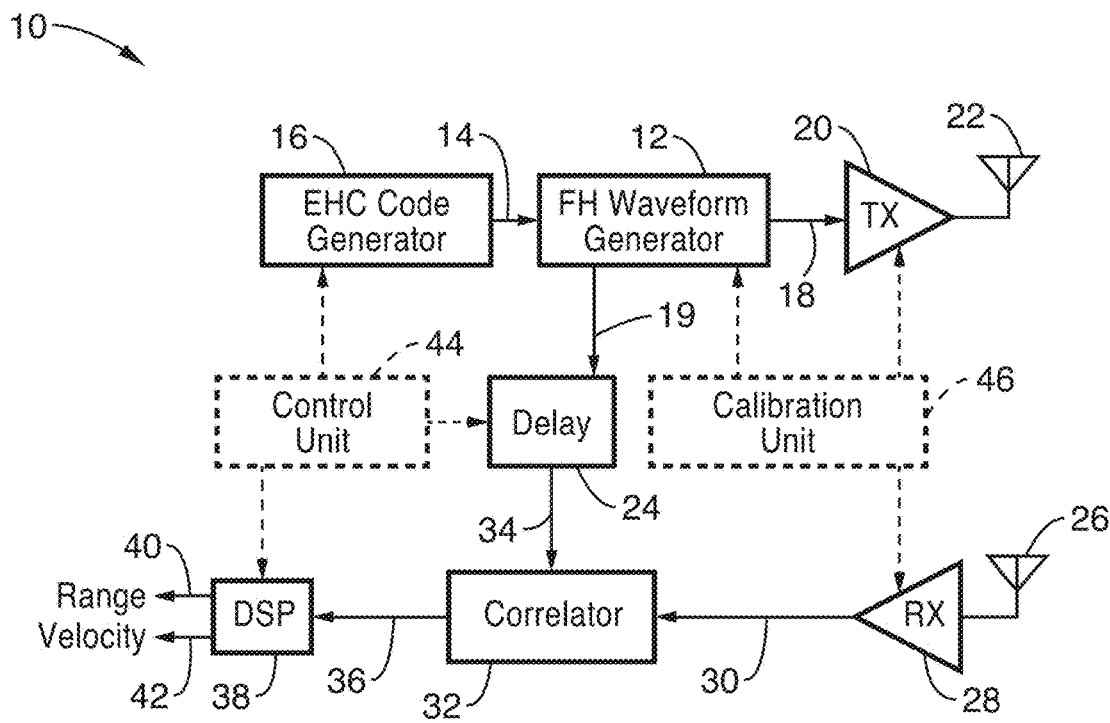
FIG. 2 is a block diagram of an interference-tolerant multiple-user FH radar system according to an embodiment of the present disclosure.

FIG. 2 illustrates an example embodiment 10 of the disclosed frequency hopping continuous wave (FHCW) radar system. The FH waveform generator 12 captures the EHC codes 14 from EHC code generator 16, and outputs the EHC FH waveform 18 to a transmitter 20, shown with transmit antenna 22, and also outputs waveform 19 to a delay unit 24. The receiving signal is received at antenna 26 coupled to receiver 28. The received signal is output 30 to a correlator 32 which correlates the received signal with the delayed version 34 of the reference signal and outputs the correlated signal 36 for further processing at a digital signal processing (DSP) circuit 38, which outputs both range 40 and velocity 42 information for this reference user.

A control unit 44 is configured for controlling EHC code generator 16, delay 24, and DSP 38, to estimate the range and velocity of vehicles. The transmitter (TX) 20, receiver (RX) 28, and waveform generator 12 are calibrated to control the biasing of blocks within these circuits to optimize the FH radar function. In at least one embodiment, the tuning is performed utilizing digital-to-analog converters (DACs) which receive digital data from a controller and output an analog tuning signal, although other output circuits may be utilized for controlling operation of these circuits.

Figure 3:
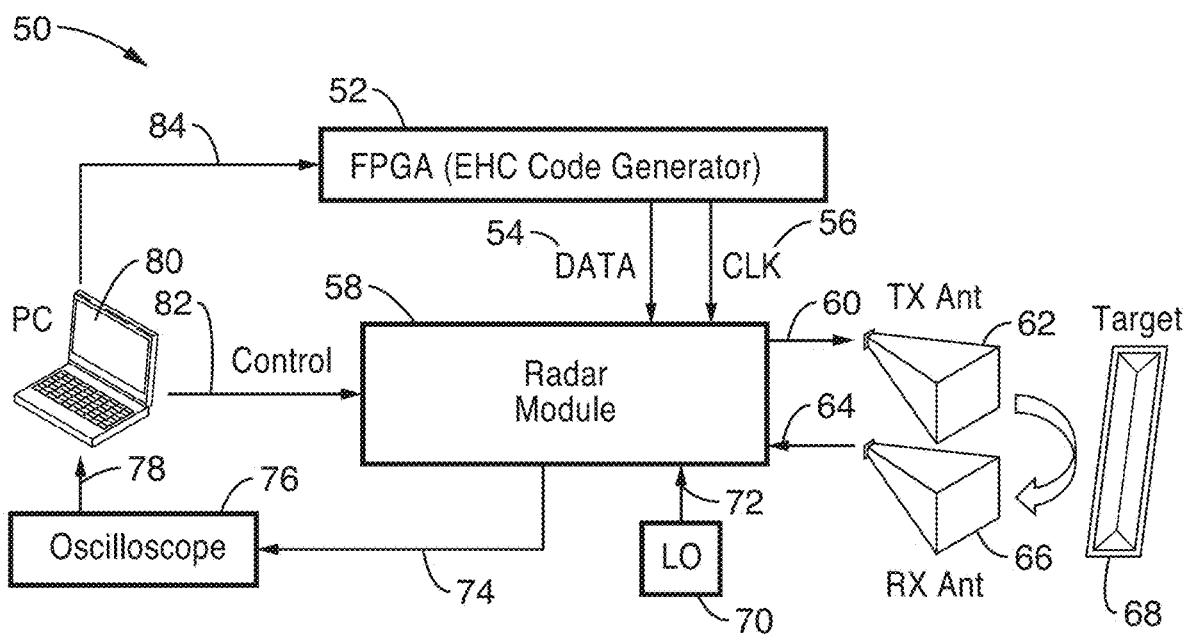
FIG. 3 is a block diagram of the interference-tolerant multiple-user FH radar system utilizing a radar module according to an embodiment of the present disclosure.

FIG. 3 illustrates an example embodiment 50 of the FH radar measurement platform. In this example embodiment, an EHC code generator 52 is implemented as a field programmable gate array (FPGA) for producing the encoded EHC data 54 and clock 56 to radar module 58. It will be appreciated, however, that the EHC data segments can be generated using circuits other than an FPGA, such as using other forms of programmable logic elements, sequencers, application specific integrated circuits (ASICs) and/or various sequential logic circuitry without limitation.

The on-chip transmission from radar module 58 radiates 60 (e.g., 24 GHz in the example described) through a transmit antenna (TX Ant) 62 (e.g., horn antenna). The receiver antenna (RX Ant) 66 (e.g., horn antenna) receives the reflected signal of FH radar 50 from target 68 (e.g., representing a structure portion of another vehicle or other solid structure along the path of the radar), and couples received signal 64 into radar module 58. A LO signal 72 is a frequency tone received from a signal generator 70. The down-converted baseband signals are output 74 by radar module 58 for capture by a signal capture device, exemplified herein for demonstration purposes as an oscilloscope 76, with output 78 coupled for further post processing, as shown by way of example and not limitation, on a computer 80 (e.g., laptop PC) executing instructions (e.g., an application) written for controlling the radar system. In addition, this computer device, or a separate controller as desired, is seen configured for outputting control information 82 to radar module 58, and control information 84 to the code generator 52.

Table 1 summarizes radar system parameters of this example embodiment of the invention. It will be appreciated that these operating parameters of the disclosed FH radar are provided by way of example, and that systems may be designed which significantly differ from these parameters without departing from the teachings of the present disclosure.

Figure 4:
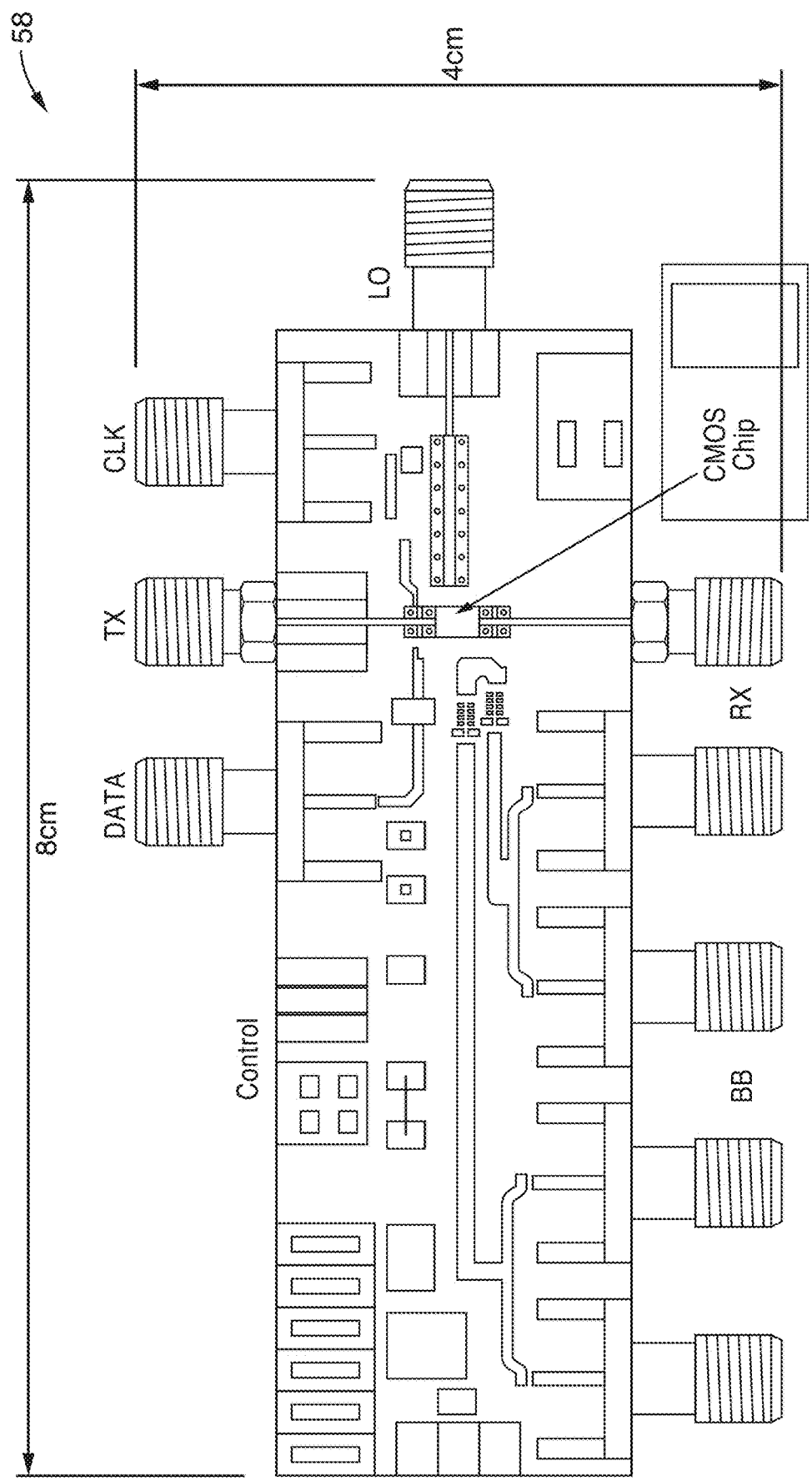
FIG. 4 is a pictorial rendition of a CMOS radar module as utilized in FIG. 3 according to an embodiment of the present disclosure.

FIG. 4 illustrates an example embodiment 58 of the radar module shown in FIG. 3. It will be noted that the figure is a line-art rendering of an actual circuit implemented for this disclosure. The radar module 58 is shown with control inputs (Control), data input (DATA), transmitter output (TX), clock input (CLK), LO input (LO), receiver input (RX), and baseband (BB) outputs (lower left four connectors) of the radar signals. Radar module 58 is also shown with an integrated circuit (IC) (or less preferably multiple integrated circuits as desired) which contains the circuitry for the system, for example in at least one embodiment combining data receiver, serial-to-parallel demultiplexer (demux), mapping decoder, integrated on a chip (integrated circuit or ASIC) to drive a FH waveform generator. By integrating these functions, the size of this radar module 58 is seen as being 4 cm×8 cm, although this can be made smaller or larger depending upon the technology as well as the intended application and the number of elements to be integrated within the module.

In this example embodiment, the total bandwidth of the FH signal is 1 GHz with 8-bit frequency step resolution. It should be appreciated that the system can be implemented with different FH signal bandwidth and frequency resolution without departing from the teachings herein.

Figure 5:
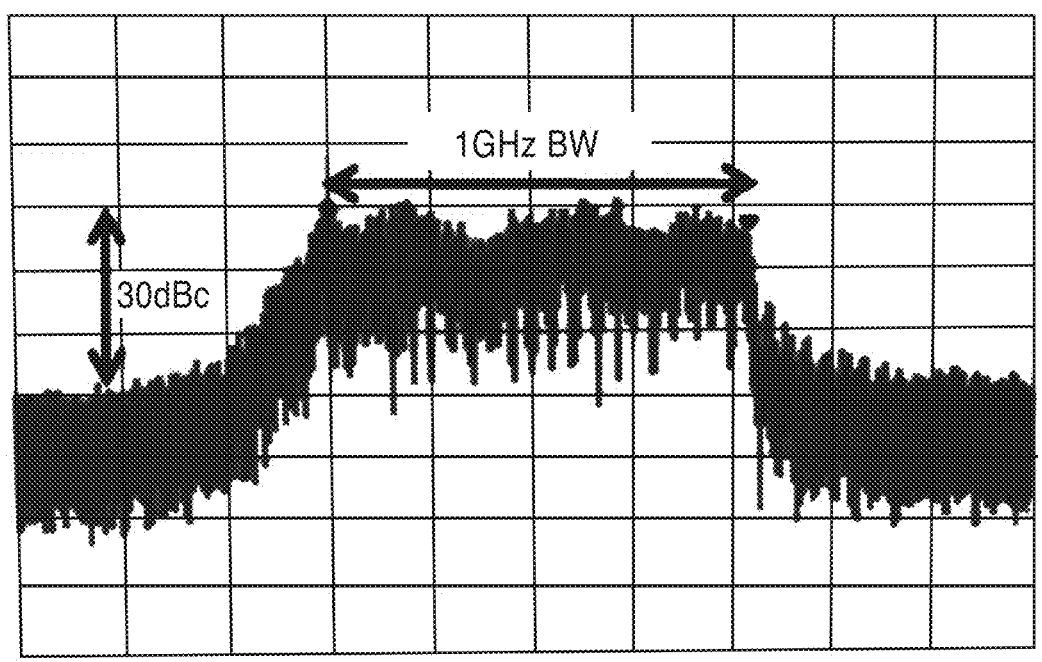
FIG. 5 is a waveform of transmitting frequency spectrum of an EHC FH radar for an embodiment of the present disclosure.

FIG. 5 depicts a rendering of a captured TX output spectrum of EHC FH radar at 24 GHz. The bandwidth of the FH signal is 1 GHz with the sideband rejection of 30 dBc at 500 MHz offset, which is a primary inherited advantage of the FH signal. There is no need for sideband cancellation technique in direct sequence SS radars.

Figure 6:
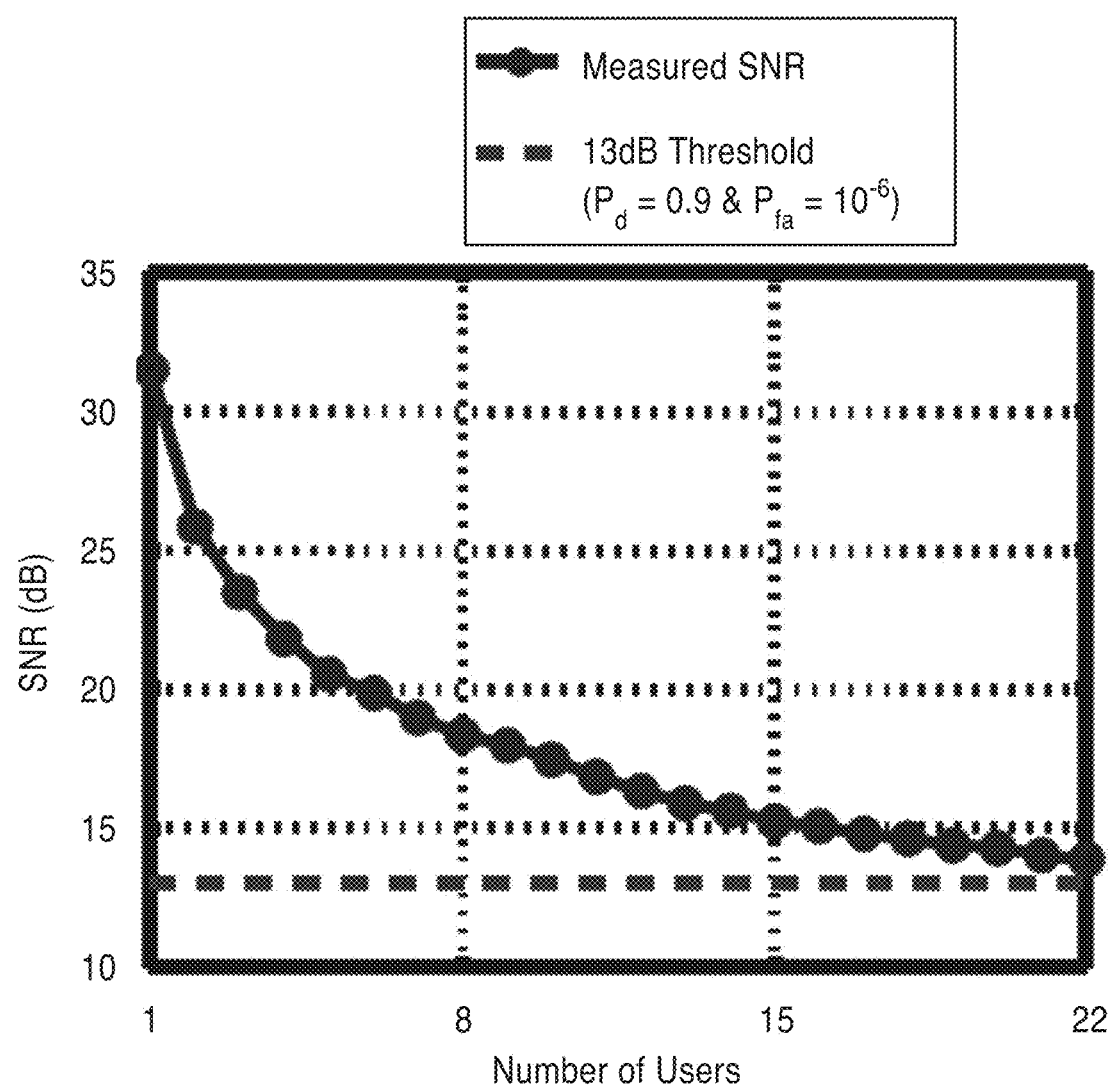
FIG. 6 is a plot of measured radar signal-to-noise ratio (SNR) in a multiple-user environment for an embodiment of the present disclosure.

FIG. 6 depicts the value of signal-to-noise ratio (SNR) provided by the system in response to the number of users. The SNR decreases due to the increase of radar users and corresponding interferences. Nevertheless, the SNR stays above 13 dB (dashed line). It should be appreciated that 13 dB is a known threshold indicating an SNR limit for 0.9 detection probability and $10^{-6}$ false alarm rate in a general radar system, which the present system can attain even with 22 users in the vicinity, thus it maintains a detection probability $P_d$=0.9 with the false alarm rate $P_{fa}$=$10^{-6}$.

FIG. 7A and FIG. 7A depict measured range plots of the EHC FH radar in multiple-user environment. In FIG. 7A are seen three waveforms, one for a single user (lowest waveform), one waveform for 2 users (middle peaking waveforms), and one waveform for 22 users (upper peaking waveform). The lower waveform for 2 users is an auto-correlation function with a peak at 2 meters (as per the example in FIG. 3 in which target 64 is at 2 meters distance) with average −32 dB noise level normalized to the signal in a single-user environment. Obviously, the signal can be detected correctly in a single user scenario. The unambiguous range is 75 meters due to the example 0.5 μs code length. In a 2-user environment shown in the middle peaking waveform, the average noise level goes up to −25 dB due to the interference introduced by the second user. The upper peaking waveform shows that the reference correlates with the sum of all 22 users, including the target. The peak still appears at 2 meters with the average noise level of −14 dB, which corresponds to the sum of all interference from the other 21 users. In fact, the overall average noise level is actually the sum of the auto-correlation function and the cross-correlation function.

FIG. 7B shows the scenario that the radar receives only the interference from other users but no signals from the target. In this scenario, the reference signal correlates with other users which have different EHC codes, that is the cross-correlation function. The average interference level is around −26 dB in a 2-user environment (lower peaking waveform) and −14 dB in a 22-user environment (upper peaking waveform), which matches to the results shown in FIG. 7A.

The above verifies that the interference level is well-managed in the disclosed EHC FH radar system. From these measurement results, it will be appreciated that targets can be correctly detected in a multiple-user scenario with up to at least 22 other users. These results prove that EHC FH code has the needed interference immunity property for intended multiple-user radar systems.

Table 2 provides an example of Matlab instructions for implementing a simulation of an embodiment of the FHCW radar of the present disclosure.

The interference-tolerant multiple-user radar system in the presented technology can be readily implemented using various forms of control circuitry. Although an FPGA is described for use in the code generator, other forms of programmable logic may be utilized. In addition, despite an oscilloscope and PC depicted for controlling the radar and utilizing its output, it should also be appreciated that various applications will include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to provide radar control and processing of radar outputs. By way of example and not limitation, in a vehicle system, one or more computer processors would usually be provided which can replace the functions of the oscilloscope and PC described herein. The presented technology is non-limiting with regard to memory and computer-readable media, insofar as these are non-transitory, and thus not constituting a transitory electronic signal.

It should also be appreciated that as used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Despite reciting specific structures, materials and method steps in the described example embodiments, it should be recognized that other structures, materials and method steps which are similar or equivalent to those described herein can be utilized without departing from the teachings of the present disclosure.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), digital signal processor (DSP) and computer are used synonymously to denote a device capable of executing the instructions and communicating with input/output interfaces and/or peripheral devices, and that the terms processor, hardware processor, computer processor, CPU, DSP and computer are intended to encompass single or multiple devices, single core and multicore devices, and variations thereof.

From the description herein, it will be appreciated that that the present disclosure encompasses multiple embodiments which include, but are not limited to, the following:

1. An interference-tolerant multiple-user radar apparatus, comprising: (a) a frequency hopping continuous wave (FHCW) radar transmitter and radar receiver; (b) an FH waveform generator coupled to said FHCW radar transmitter; (c) an extended hyperbolic congruential (EHC) code generator configured for sending EHC codes as one-coincidence FH codes to the FH waveform generator; (d) a delay unit coupled to said FH waveform generator and configured for selective delay of EHC FH waveforms received from said FH waveform generator; (e) wherein said EHC FH waveforms are output from said FH waveform generator to said FHCW radar transmitter and to said delay unit; (f) a correlator circuit coupled to a received signal from said FHCW radar receiver, along with a delayed version of the waveform generated through said FHCW radar transmitter by said delay unit, said correlator circuit is configured for correlating a received radar signal from said FHCW receiver with a selectively delayed version of a signal transmitted from said FHCW transmitter; and (g) wherein said interference-tolerant multiple-user radar apparatus utilizes a sequence of hopping, configured to provide a form of multiplexing of each of a plurality of proximal said interference-tolerant multiple-user radar apparatus to differentiate radar signals from each other; and (h) a digital signal processing circuit configured for processing output from said correlator circuit to extract and output range and velocity information.

2. The apparatus of any preceding embodiment, wherein said one-coincidence FH codes are configured to assure that maximum number of hits between any pair of sequences belonging to the set is one.

3. The apparatus of any preceding embodiment, wherein said correlator circuit utilizes optimal Hamming correlation property of said EHC codes.

4. The apparatus of any preceding embodiment, wherein said correlator circuit utilizes optimal Hamming correlation property of said EHC codes.

5. The apparatus of any preceding embodiment, further comprising a calibration circuit for tuning circuit elements of said radar apparatus in response to generating biasing signals to said circuit elements in said radar apparatus.

6. The apparatus of any preceding embodiment, wherein said circuit elements configured for calibration by said calibration circuit comprise said radar transmitter, said radar receiver, and said frequency hopping (FH) waveform generator.

7. The apparatus of any preceding embodiment, further comprising a control circuit configured for controlling inter-operation of said extended hyperbolic congruential (EHC) code generator, said delay circuit, and said digital signal processor (DSP).

8. The apparatus of any preceding embodiment, wherein said radar apparatus is configured for use in vehicle collision avoidance and/or navigation.

9. The apparatus of any preceding embodiment, wherein said radar apparatus mitigates interference that arises in response to multiple signals transmitted from said plurality of radar apparatus operating in adjacent vehicles in a given window of time.

10. The apparatus of any preceding embodiment, wherein said multiple signals transmitted from said plurality of radar apparatus comprises a multiple from two to over twenty radars operating simultaneously.

11. The apparatus of any preceding embodiment, wherein said radar apparatus utilizes a form of code-division multiplexing involving one-coincidence frequency hopping code and thus does not require allocating frequency sub-bands at different times for different users to avoid concurrent frequency band usage.

12. An interference-tolerant multiple-user radar apparatus, comprising: (a) a frequency hopping continuous wave (FHCW) radar transmitter and radar receiver; (b) an FH waveform generator coupled to said FHCW radar transmitter; (c) an extended hyperbolic congruential (EHC) code generator configured for sending EHC codes as a set of one-coincidence FH codes to the FH waveform generator; (d) wherein said one-coincidence FH codes are configured to assure that maximum number of hits between any pair of sequences belonging to the set is one; (e) a delay unit coupled to said FH waveform generator and configured for selective delay of EHC FH waveforms received from said FH waveform generator; (f) wherein said EHC FH waveforms are output from said FH waveform generator to said FHCW radar transmitter and to said delay unit; (g) a correlator circuit coupled to a received signal from said FHCW radar receiver, along with a delayed version of the waveform generated through said FHCW radar transmitter by said delay unit, said correlator circuit is configured for utilizing optimal Hamming correlation property of said EHC codes for correlating a received radar signal from said FHCW receiver with a selectively delayed version of a signal transmitted from said FHCW transmitter; and (h) wherein said interference-tolerant multiple-user radar apparatus utilizes a sequence of hopping, configured to provide a form of multiplexing for each of a plurality of proximal said interference-tolerant multiple-user radar apparatus to differentiate radar signals from each other; and (i) a digital signal processing circuit configured for processing output from said correlator circuit to extract and output range and velocity information.

13. The apparatus of any preceding embodiment, further comprising a calibration circuit for tuning circuit elements of said radar apparatus in response to generating biasing signals to said circuit elements in said radar apparatus.

14. The apparatus of any preceding embodiment, wherein said circuit elements configured for calibration by said calibration circuit comprise said radar transmitter, said radar receiver, and said frequency hopping (FH) waveform generator.

15. The apparatus of any preceding embodiment, further comprising a control circuit configured for controlling interoperation of said extended hyperbolic congruential (EHC) code generator, said delay circuit, and said digital signal processor (DSP).

16. The apparatus of any preceding embodiment, wherein said radar apparatus is configured for use in vehicle collision avoidance and/or navigation.

17. The apparatus of any preceding embodiment, wherein said radar apparatus mitigates interference that arises in response to multiple signals transmitted from said plurality of radar apparatus operating in adjacent vehicles in a given window of time.

18. The apparatus of any preceding embodiment, wherein said multiple signals transmitted from said plurality of radar apparatus comprises a multiple from two to over twenty radars operating simultaneously.

19. The apparatus of any preceding embodiment, wherein said radar apparatus utilizes a form of code-division multiplexing involving one-coincidence frequency hopping code and thus does not require allocating frequency sub-bands at different times for different users to avoid concurrent frequency band usage.

20. A method of interference-tolerant multiple-user radar, comprising: (a) coupling a frequency hopping (FH) waveform generator to a radar transmitter for outputting a transmitted radar signal; (b) generating extended hyperbolic congruential (EHC) codes as one-coincidence FH codes to the FH waveform generator so that it generates EHC FH waveforms; (c) selectively delaying said EHC FH waveforms and coupling these to a correlator which receives a received radar signal including reflections of said transmitted radar signal, along with the selectively delayed version of EHC FC waveforms, and correlates frequency hopping to discern said transmitted radar signal from interference from other nearby FH radar devices; (d) utilizing a sequence of hopping to provide interference-tolerant multiple-user radar operation as a form of multiplexing for each of a plurality of proximal interference-tolerant multiple-user radars to differentiate radar signals from each other; and (e) digitally processing output from said correlator for extracting and outputting range and velocity information.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Summary of FH Radar System Parameters

| | |
|---|---|
| Frequency | 24 GHz |
| Bandwidth | 1 GHz |
| Frequency Steps | 23 |
| Symbol Rate | 45 MHz |
| EHC Code Length | 0.5 µs |
| Number of Users | 22 |
| Range Resolution | 15 cm |
| Max. Unambiguous Range | 75 m |
| Transmit Power | 4 dBm |
| Receiver Conversion Gain | 22 dB |
| Receiver Noise Figure | 9 dB |
| Sideband Rejection | −30 dBc @ 500 MHz |
| Power Consumption | 143 mW |

TABLE 2

Simulation in Matlab Code for Interference-Tolerant Multiple-user Radar System

```
swp=100;
n_sam_per_f=1e4;
n_sim=swp*n_sam_per_f;
n_inter=10;
rfm_ram_inter=zeros(n_sim,n_inter);
f_ran_win_lin_inter=zeros(n_sim,n_inter);
for k=1:n_inter
n_step=21;
n_step1=n_step-1;
f_step=round(1500/n_step1);
f_ran=0.001+0.001.*f_step.*round(n_step1.*rand(100,1));
window=ones(1,10000);
f_ran_win=zeros(length(f_ran),length(window));
for i=1:length(f_ran)
f_ran_win(i,:)=conv(f_ran(i),window);
end
f_ran_win_lin=reshape(f_ran_win.',length(f_ran)*length(window),1);
t100=linspace(0,1000-1,length(f_ran_win_lin));
f_ran_win_lin_inter(:,k)=f_ran_win_lin;
sam_period=0.1*1e-9;
n_sam_per_f=10000;
swp=100;
t1e6=linspace(0,n_sam_per_f*swp-1,n_sam_per_f*swp);
t1e6_s=t1e6.*0.1*1e-9;
t1e6_s_re=reshape(t1e6_s,n_sam_per_f,swp).';
phi=zeros(swp,n_sam_per_f);
ph_ran=2*pi*rand(swp,1);
for i=1:n_sam_per_f
   phi(:,i)=ph_ran;
end
f_ran_win_hz=1e9.*f_ran_win;
wv=cos(2.*pi.*f_ran_win_hz.*t1e6_s_re+phi);
%wv=cos(2.*pi.*f_ran_win_hz.*t1e6_s_re);
wv_sw=reshape(wv.',swp*n_sam_per_f,1);
rfm=0.5+0.5.*wv_sw;
rfm_ram=rfm;
dn_rate=10;
a_ran=zeros(swp,n_sam_per_f);
n_step_am=2;
n_step1_am=n_step_am-1;
a_step=round(1000/n_step1_am);
amp_bias=0;
amp_change=1-amp_bias*0.001;
for i=1:swp
   a_ran_lvl=a_step.*round(n_step1_am.*rand(n_sam_per_f/
     dn_rate,1));
   a_ran_lvl_dn=zeros(dn_rate,n_sam_per_f/dn_rate);
   for j=1:dn_rate
      a_ran_lvl_dn(j,:)=a_ran_lvl;
   end
   a_ran(i,:)=(0.001*(amp_bias+amp_change*reshape(a_ran_lvl_dn,
     n_sam_per_f,1)).');
end
rfm_ram=0.5+reshape(a_ran,swp*n_sam_per_f,1).*(rfm-0.5);
%{
rfm_ram=rfm;
a_ran=zeros(n_sam_per_f,swp);
n_step_am=2;
n_step1_am=n_step_am-1;
a_step=round(1000/n_step1_am);
amp_bias=0;
amp_change=1-amp_bias*0.001;
for i=1:swp
   a_ran(:,i)=(0.001*(amp_bias+amp_change*a_step.*
     round(n_step1_am.*rand(n_sam_per_f,1))).');
end
rfm_ram=0.5+reshape(a_ran.',swp*n_sam_per_f,1).*(rfm-0.5);
%}
rfm_ram_inter(:,k)=rfm_ram;
end
f_ran_win_lin=f_ran_win_lin_inter(:,1);
t100=linspace(0,1000-1,length(f_ran_win_lin));
figure(21);
plot(t100,f_ran_win_lin);
figure(31);
subplot(2,1,1);
plot(reshape(t1e6_s_re.', swp*n_sam_per_f,1),rfm);
rfm_ram=rfm_ram_inter(:,1);
subplot(2,1,2);
plot(reshape(t1e6_s_re.',swp*n_sam_per_f,1),rfm_ram);
figure(41)
subplot(2,1,1);
Fs = 10e9;
nfft = 2^nextpow2(length(rfm));
Pxx = abs(fft(rfm,nfft)).^2/nfft/Fs;
% Create a single-sided spectrum
Hpsd = dspdata.psd(Pxx(1:length(Pxx)/2),'Fs',Fs);
plot(Hpsd);
subplot(2,1,2);
Pxx_ram = abs(fft(rfm_ram,nfft)).^2/nfft/Fs;
% Create a single-sided spectrum
Hpsd_ram = dspdata.psd(Pxx_ram(1:length(Pxx_ram)/2),'Fs',Fs);
plot(Hpsd_ram);
n=swp*n_sam_per_f;
delay=5111;
sq=n/10;
t=zeros(n,1);
s_noise=rfm_ram(:,1);
t_sq=linspace(0,sq,sq);
tn=linspace(0,n,n);
s_noise_mag=abs(s_noise);
s_noise_mag_mean=mean(s_noise_mag);
s_noise_mag_std=std(s_noise_mag);
s_noise_ang=angle(s_noise);
s_noise_ang_deg=angle(s_noise)/(2*pi)*360;
s_noise_delay=s_noise((1+delay):(sq+delay));
s_noise_delay_mag=abs(s_noise_delay);
s_noise_delay_mag_mean=mean(s_noise_delay_mag);
s_noise_delay_mag_std=std(s_noise_delay_mag);
s_noise_delay_ang=angle(s_noise_delay);
s_noise_delay_ang_deg=angle(s_noise_delay)/(2*pi)*360;
%{
figure(1);
subplot(4,1,1);
plot(t100,s_noise_mag(1:100));
subplot(4,1,2);
plot(t100,s_noise_mag(101:200));
subplot(4,1,3);
plot(t100,s_noise_mag(1:100));
subplot(4,1,4);
plot(t100,s_noise_delay_mag);
N_FFT=1024;
s_f=fft(s_noise(101:n),N_FFT);
f=linspace(0,N_FFT,N_FFT);
s_f_delay=fft(s_noise_delay,N_FFT);
figure(2);
subplot(2,1,1);
plot(f,abs(s_f));
subplot(2,1,2);
plot(f,abs(s_f_delay));
%}
%{
C = xcorr(s_noise(1:sq),s_noise_delay);
C_mag=abs(C);
t_C=linspace(0,sq-1,sq);
figure(3);
subplot(2,1,1);
plot(t_C,C(sq:2*sq-1));
%}
t_cor=sq;
s_if=zeros(t_cor,1);
parfor i=0:(t_cor-1)
aaa=abs(s_noise_delay).*abs(s_noise((1+i):(sq+i)));
s_if(i+1)=sum(aaa);
end
s_if_mag=abs(s_if);
figure(3);
subplot(2,1,1);
plot(t_sq,s_if_mag);
%{
%%% MI Mutual Information
s_if_MI=zeros(t_cor,1);
for i=0:(t_cor-1)
ccc=cov(s_noise_delay,(s_noise((1+i):(sq+i))));
```

TABLE 2-continued

Simulation in Matlab Code for Interference-Tolerant Multiple-user Radar System

```
s_if_MI(i+1)=−0.5*log2(det(ccc)/
(var(s_noise_delay)*var(s_noise((1+i):(sq+i)))));
end
subplot(2,1,2);
plot(t_sq,s_if_MI);
%}
%{
%% nonlinearity
k=10; %nonliner coefficient
s_if_nonlin=zeros(t_cor,1);
for i=0:(t_cor−1)
aaa=(s_noise_delay+k*(s_noise_delay.*s_noise_delay)).*
s_noise((1+i):(100+i));
s_if_nonlin(i+1)=sum(aaa);
end
figure(31);
subplot(2,1,1);
plot(t100,s_if_nonlin);
s_if_nonlin_MI=zeros(t_cor,1);
for i=0:(t_cor−1)
ccc=cov(s_noise_delay+k*(s_noise_delay.*s_noise_delay),
(s_noise((1+i):(100+i))));
%s_if_MI(i+1)=−
0.5*log2(det(ccc)/(var(s_noise_delay)*var(s_noise((1+i):(100+i)))));
s_if_nonlin_MI(i+1)=−
0.5*log2(det(ccc)/(var(k*(s_noise_delay+s_noise_delay.*
s_noise_delay))*var(s_noise((1+i):(100+i)))));
end
subplot(2,1,2);
plot(t100,s_if_nonlin_MI);
%}
%% interference
s_noise1=rfm_ram_inter(:,2);
s_noise2=rfm_ram_inter(:,3);
s_noise3=rfm_ram_inter(:,4);
s_noise4=rfm_ram_inter(:,5);
s_noise5=rfm_ram_inter(:,6);
s_noise6=rfm_ram_inter(:,7);
s_noise7=rfm_ram_inter(:,8);
s_noise8=rfm_ram_inter(:,9);
s_noise9=rfm_ram_inter(:,10);
%{
figure(5);
subplot(10,1,1);
plot(t100,s_noise(1:100));
subplot(10,1,2);
plot(t100,s_noise1(1:100));
subplot(10,1,3);
plot(t100,s_noise2(1:100));
subplot(10,1,4);
plot(t100,s_noise3(1:100));
subplot(10,1,5);
plot(t100,s_noise4(1:100));
subplot(10,1,6);
plot(t100,s_noise5(1:100));
subplot(10,1,7);
plot(t100,s_noise6(1:100));
subplot(10,1,8);
plot(t100,s_noise7(1:100));
subplot(10,1,9);
plot(t100,s_noise8(1:100));
subplot(10,1,10);
plot(t100,s_noise9(1:100));
%}
s_noise_inter=[s_noise_delay...
    s_noise1(1:sq)...
    s_noise2(1:sq)...
    s_noise3(1:sq)...
    s_noise4(1:sq)...
    s_noise5(1:sq)...
    s_noise6(1:sq)...
    s_noise7(1:sq)...
    s_noise8(1:sq)...
    s_noise9(1:sq)];
n_inter=9; %number of interference
s_noise_inter_sum=s_noise_inter(1:sq,1:(n_inter+1));
s_noise_delay_inter=sum(s_noise_inter_sum,2);
```

TABLE 2-continued

Simulation in Matlab Code for Interference-Tolerant Multiple-user Radar System

```
s_if_inter=zeros(t_cor,1);
parfor i=0:(t_cor−1)
aaa=s_noise_delay_inter.*s_noise((1+i):(sq+i));
s_if_inter(i+1)=sum(aaa);
end
figure(6);
subplot(2,1,1);
plot(t_sq,s_if_inter);
%{
s_if_inter_MI=zeros(t_cor,1);
parfor i=0:(t_cor−1)
ccc=cov(s_noise_delay_inter,(s_noise((1+i):(sq+i))));
s_if_inter_MI(i+1)=−
0.5*log2(det(ccc)/(var(s_noise_delay_inter)*var(s_noise((1+i):(sq+i)))));
end
subplot(2,1,2);
plot(t_sq,s_if_inter_MI);
%}
```

What is claimed is:

1. An interference-tolerant multiple-user radar apparatus, comprising:
 a frequency hopping continuous wave (FHCW) radar transmitter and radar receiver;
 an FH waveform generator coupled to said FHCW radar transmitter;
 an extended hyperbolic congruential (EHC) code generator configured for sending EHC codes as one-coincidence FH codes to the FH waveform generator;
 a delay unit coupled to said FH waveform generator and configured for selective delay of EHC FH waveforms received from said FH waveform generator;
 wherein said EHC FH waveforms are output from said FH waveform generator to said FHCW radar transmitter and to said delay unit;
 a correlator circuit coupled to a received signal from said FHCW radar receiver, along with a delayed version of the waveform generated through said FHCW radar transmitter by said delay unit, said correlator circuit is configured for correlating a received radar signal from said FHCW receiver with a selectively delayed version of a signal transmitted from said FHCW transmitter; and
 wherein said interference-tolerant multiple-user radar apparatus utilizes a sequence of hopping, configured to provide a form of multiplexing for each of a plurality of proximal said interference-tolerant multiple-user radar apparatus to differentiate radar signals from each other; and
 a digital signal processing circuit configured for processing output from said correlator circuit to extract and output range and velocity information.

2. The apparatus of claim 1, wherein said one-coincidence FH codes are configured to assure that maximum number of hits between any pair of sequences belonging to the set is one.

3. The apparatus of claim 1, wherein said correlator circuit utilizing optimal Hamming correlation property of said EHC codes.

4. The apparatus of claim 1, further comprising a calibration circuit for tuning circuit elements of said radar apparatus in response to generating biasing signals to said circuit elements in said radar apparatus.

5. The apparatus of claim 4, wherein said circuit elements configured for calibration by said calibration circuit comprise said radar transmitter, said radar receiver, and said frequency hopping (FH) waveform generator.

6. The apparatus of claim 1, further comprising a control circuit configured for controlling interoperation of said extended hyperbolic congruential (EHC) code generator, said delay circuit, and said digital signal processor (DSP).

7. The apparatus of claim 1, wherein said radar apparatus is configured for use in vehicle collision avoidance and/or navigation.

8. The apparatus of claim 7, wherein said radar apparatus mitigates interference that arises in response to multiple signals transmitted from said plurality of radar apparatus operating in adjacent vehicles in a given window of time.

9. The apparatus of claim 8, wherein said multiple signals transmitted from said plurality of radar apparatus comprises a multiple from two to over twenty radars operating simultaneously.

10. The apparatus of claim 1, wherein said radar apparatus utilizes a form of code-division multiplexing involving one-coincidence frequency hopping code and thus does not require allocating frequency sub-bands at different times for different users to avoid concurrent frequency band usage.

11. An interference-tolerant multiple-user radar apparatus, comprising:
   a frequency hopping continuous wave (FHCW) radar transmitter and radar receiver;
   an FH waveform generator coupled to said FHCW radar transmitter;
   an extended hyperbolic congruential (EHC) code generator configured for sending EHC codes as a set of one-coincidence FH codes to the FH waveform generator;
   wherein said one-coincidence FH codes are configured to assure that maximum number of hits between any pair of sequences belonging to the set is one;
   a delay unit coupled to said FH waveform generator and configured for selective delay of EHC FH waveforms received from said FH waveform generator;
   wherein said EHC FH waveforms are output from said FH waveform generator to said FHCW radar transmitter and to said delay unit;
   a correlator circuit coupled to a received signal from said FHCW radar receiver, along with a delayed version of the waveform generated through said FHCW radar transmitter by said delay unit, said correlator circuit is configured for utilizing optimal Hamming correlation property of said EHC codes for correlating a received radar signal from said FHCW receiver with a selectively delayed version of a signal transmitted from said FHCW transmitter; and
   wherein said interference-tolerant multiple-user radar apparatus utilizes a sequence of hopping, configured to provide a form of multiplexing for each of a plurality of proximal said interference-tolerant multiple-user radar apparatus to differentiate radar signals from each other; and
   a digital signal processing circuit configured for processing output from said correlator circuit to extract and output range and velocity information.

12. The apparatus of claim 11, further comprising a calibration circuit for tuning circuit elements of said radar apparatus in response to generating biasing signals to said circuit elements in said radar apparatus.

13. The apparatus of claim 12, wherein said circuit elements configured for calibration by said calibration circuit comprise said radar transmitter, said radar receiver, and said frequency hopping (FH) waveform generator.

14. The apparatus of claim 11, further comprising a control circuit configured for controlling interoperation of said extended hyperbolic congruential (EHC) code generator, said delay circuit, and said digital signal processor (DSP).

15. The apparatus of claim 11, wherein said radar apparatus is configured for use in vehicle collision avoidance and/or navigation.

16. The apparatus of claim 15, wherein said radar apparatus mitigates interference that arises in response to multiple signals transmitted from said plurality of radar apparatus operating in adjacent vehicles in a given window of time.

17. The apparatus of claim 16, wherein said multiple signals transmitted from said plurality of radar apparatus comprises a multiple from two to over twenty radars operating simultaneously.

18. The apparatus of claim 11, wherein said radar apparatus utilizes a form of code-division multiplexing involving one-coincidence frequency hopping code and thus does not require allocating frequency sub-bands at different times for different users to avoid concurrent frequency band usage.

19. A method of interference-tolerant multiple-user radar, comprising:
   coupling a frequency hopping (FH) waveform generator to a radar transmitter for outputting a transmitted radar signal;
   generating extended hyperbolic congruential (EHC) codes as one-coincidence FH codes to the FH waveform generator so that it generates EHC FH waveforms;
   selectively delaying said EHC FH waveforms and coupling these to a correlator which receives a received radar signal including reflections of said transmitted radar signal, along with the selectively delayed version of EHC FC waveforms, and correlates frequency hopping to discern said transmitted radar signal from interference from other nearby FH radar devices;
   utilizing a sequence of hopping to provide interference-tolerant multiple-user radar operation as a form of multiplexing for each of a plurality of proximal interference-tolerant multiple-user radars to differentiate radar signals from each other; and
   digitally processing output from said correlator for extracting and outputting range and velocity information.

* * * * *